United States Patent

Kanda

Patent Number: 5,649,710
Date of Patent: Jul. 22, 1997

[54] UNITIZED OIL SEALS

[75] Inventor: Tsuyoshi Kanda, Fukushima, Japan

[73] Assignee: NOK Corporation, Tokyo, Japan

[21] Appl. No.: 650,943

[22] Filed: May 20, 1996

[30] Foreign Application Priority Data

Jun. 16, 1995 [JP] Japan ................... 7-174098

[51] Int. Cl.$^6$ ............... F16J 15/34; F16J 15/32
[52] U.S. Cl. ................ 277/36; 277/37; 277/38; 277/39; 277/152; 277/134
[58] Field of Search ............... 277/36, 37, 38, 277/39, 152, 134

[56] References Cited

U.S. PATENT DOCUMENTS

| | | | |
|---|---|---|---|
| 4,118,856 | 10/1978 | Bainard et al. | 277/134 |
| 4,336,945 | 6/1982 | Christiansen et al. | 277/134 |
| 4,448,426 | 5/1984 | Jackowski et al. | 277/37 |
| 4,531,748 | 7/1985 | Jackowski | 277/153 |
| 4,806,026 | 2/1989 | Bauer et al. | 277/152 |
| 4,981,303 | 1/1991 | Matsushima et al. | 277/37 |
| 5,002,289 | 3/1991 | Yasui et al. | 277/134 |
| 5,004,248 | 4/1991 | Messenger et al. | 277/37 |
| 5,269,536 | 12/1993 | Matsushima et al. | 277/35 |

*Primary Examiner*—William A. Cuchlinski, Jr.
*Assistant Examiner*—Christina Annick
*Attorney, Agent, or Firm*—Jacobson, Price, Holman & Stern, PLLC

[57] ABSTRACT

A unitized oil seal (10) includes a wear sleeve element (12) and a seal element (14). The wear sleeve element (12) is configured to include an axially outwardly and radially inwardly tapered dust sealing surface (38). The seal element (14) is provided with a dust sealing lip (82) sealingly engaging the dust sealing surface (38). The dust sealing lip (82) is configured to flare out axially outwardly and radially outwardly so that the point of contact thereof with the dust sealing surface (38) is offset axially outwardly from the plane of an abutment surface (40) of the wear sleeve element. A high degree of dirt exclusion capability is achieved. The seal element (14) includes primary and auxiliary seal lips (74, 76) which are brought into sealing engagement with the wear sleeve without a conventional garter spring.

4 Claims, 2 Drawing Sheets

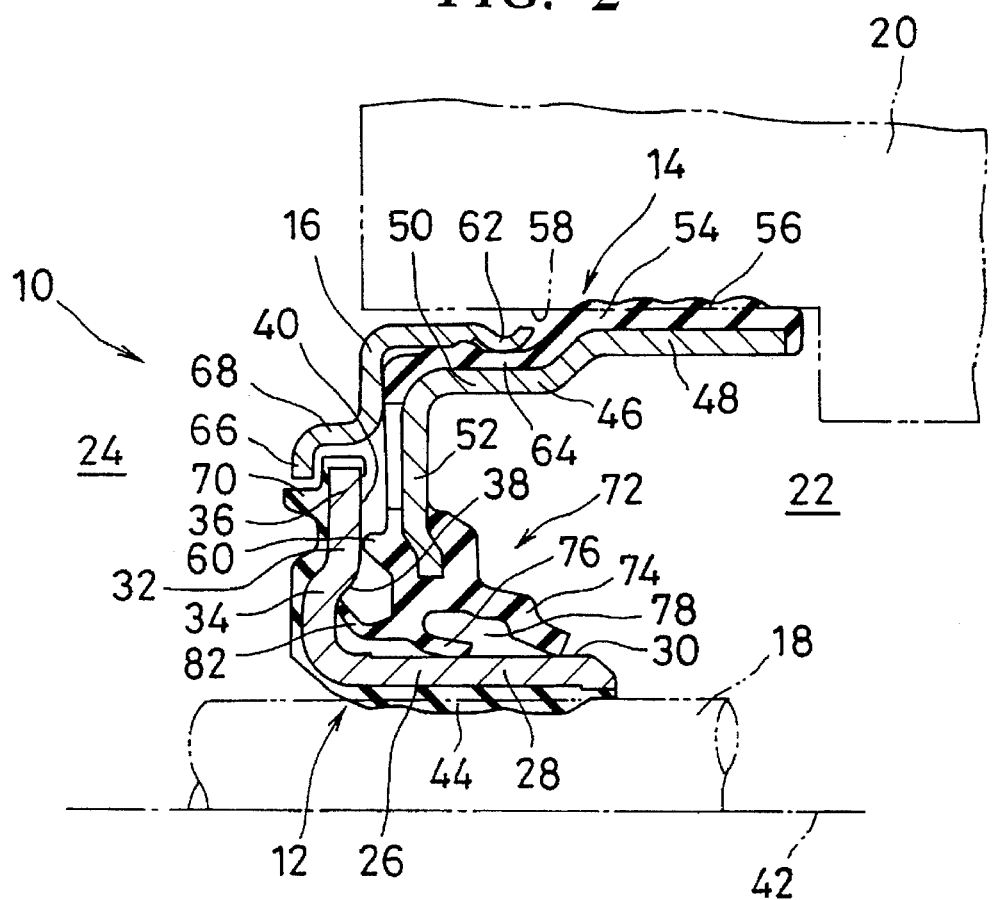
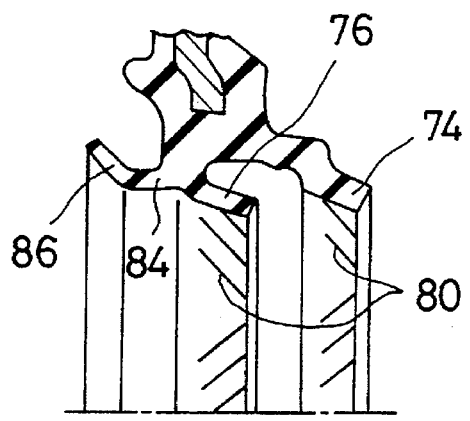
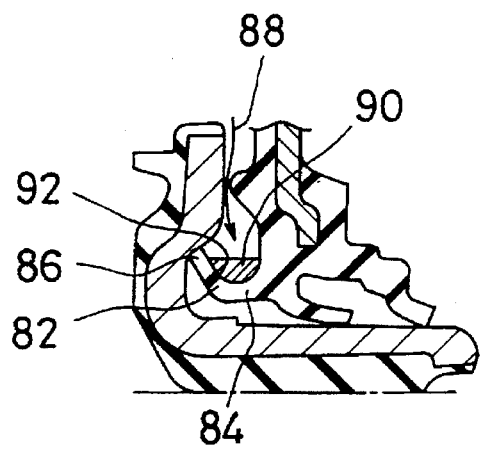

UNITIZED OIL SEALS

BACKGROUND OF THE INVENTION

1. Field of the Invention

The present invention relates generally to fluid seals for establishing a seal between a shaft and a housing which are rotatable relative to one another and, more particularly, to so-called unitized oil seals. In particular, the present invention is concerned with a novel unitized seal structure having an improved dirt exclusion capability and wherein a good oil sealing action is accomplished without recourse to the use of a conventional garter spring.

2. Description of the Prior Art

The unitized oil seals have been used advantageously in motor vehicles and related applications. As disclosed, for example, in U.S. Pat. No. 4,448,426 to Jackowski et al, U.S. Pat. No. 4,531,748 to Jackowski, U.S. Pat. No. 5,004,248 to Messenger et al, and U.S. Pat. No. 5,269,536 to Matsushima et al, a unitized oil seal includes a wear sleeve element and a seal element which are coupled together to form a single unitized assembly. In use, the wear sleeve element is press fit over a shaft such as a fixed or rotary axle of the vehicle and the seal element is press fit within a counterbore of a housing such as a wheel hub.

When the sealing lips of the seal element or the wear surface of the wear sleeve are worn out, the unitized seal may be replaced as a whole with a new one. The benefit of the unitized seal is that the outer surface of the axle is free from wear so that the life of the axle is increased.

As illustrated in the patents cited above, a unitized oil seal generally includes a so-called dust lip or dirt exclusion lip serving to prevent ingress of dust and dirt. The function of the dust lip is important in protecting the primary sealing lip from a premature wear.

In applications such as heavy trucks, it is often encountered that the unitized seals are used throughout an excessively long distance drive before the wheels are overhauled for replacement of the seals. In these situations, it is desirable that the dust lips properly sustain their intended function throughout the life of the unitized seals.

It is therefore an object of the present invention to provide a unitized oil seal having a high degree of dirt exclusion capability.

Another problem associated with the conventional unitized seals is related to the provision of a garter spring. For the purposes of ready reference, the seal structure illustrated in U.S. Pat. No. 5,269,536 to Matsushima et al is reproduced in FIG. 1 of the accompanying drawings. As shown therein, the conventional unitized seal design generally employs a garter spring 1 to bias a primary sealing lip 2 into sealing engagement with the wear sleeve element 3. The garter spring is snap fit within a spring groove 4 formed on the circumferential periphery of the primary sealing lip.

To install a new unitized seal, it is the general practice to first press fit the unitized seal within a counterbore 5 of the wheel hub 6 in the direction shown by the arrow F in FIG. 1 and to then mount the wheel hub onto the axle 7. As a rule, the operator is recommended to use a hydraulic or mechanical press so as to press fit the unitized seal without shock into the hub. However, where such a press is not available, the operator in some instances may use an impact tool such as a hammer to drive the seal into the hub. The impact of hammering may occasionally cause the garter spring to slip out of the spring groove. If after installation the operator overlooks to inspect the garter spring to see whether it is properly positioned, there is a risk that the garter spring is inadvertently lost. This would result in an insufficient sealing pressure of the primary sealing lip and, hence, would lead to a leakage of lubricant.

Accordingly, another object of the present invention is to provide a unitized oil seal wherein a conventional garter spring is eliminated and which is yet capable of providing an adequate oil sealing function.

SUMMARY OF THE INVENTION

This invention provides a unitized oil seal structure which is specifically designed to prevent ingress of dirt and slime. To this end, a radial flange of the wear sleeve element is configured to define an axially outwardly tapered surface. The seal element includes a dust lip which is brought into sealing engagement with the tapered surface of the radial flange of the wear sleeve. The dust lip is uniquely configured to flare out axially outwardly.

The tapered configuration of the dust sealing surface in combination with the axially outwardly flared dust lip serves to offset the contact point axially outwardly away from the plane of the remainder of the radial flange of the wear sleeve element. The advantage of this offset arrangement is that the contact point of the dust lip with the radial flange is less susceptible to attack by the flow of intruding slime or mud water. Accordingly, a high degree of dirt exclusion performance is attained.

In the preferred embodiment, the conventional garter spring is abolished and the sealing element is provided with a primary sealing lip and an auxiliary sealing lip located axially outwardly of the primary sealing lip. The primary sealing lip is brought into contact with the wear surface of the wear sleeve solely by the resiliency of the primary sealing lip. As in this manner the garter spring is eliminated, the unitized seal may be properly installed even with an impact tool.

These features and advantages of the invention, as well as other features and advantages thereof, will become apparent from the following description.

BRIEF DESCRIPTION OF THE DRAWINGS

FIG. 2 is an enlarged cross-sectional view showing the unitized seal according to the invention;

FIG. 3 is an enlarged fragmentary cross-sectional view showing a part of the unitized seal shown in FIG. 2;

DESCRIPTION OF THE PREFERRED EMBODIMENT

Figure 1:
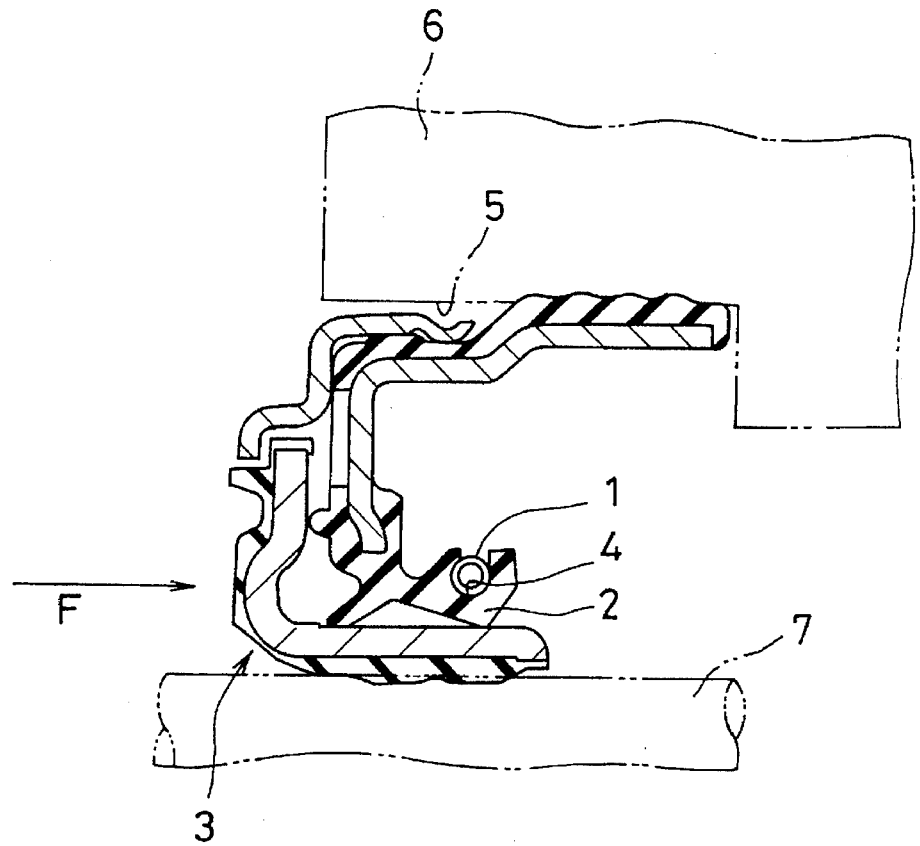
FIG. 1 is an enlarged cross-sectional view of a conventional unitized seal.

Referring to FIG. 2, the unitized oil seal assembly, generally designated by the reference numeral 10, includes a wear sleeve element 12 and a seal element 14 which are coupled together by a unitizing ring 16.

The unitized seal assembly 10 is intended to seal a fixed or rotary shaft, such as an axle 18 of a vehicle, with respect to a housing, such as a wheel hub 20. According to the terminology commonly used in the art, the sealed region 22 will be referred to as the "oil side" and the opposite region 24 as the "air side".

The wear sleeve element 12 includes an annular wear sleeve 26 made, for example, by stamping of a sheet metal blank. The wear sleeve 26 includes a tubular section 28 having a polished outer surface 30 serving as a wear surface with which a primary and auxiliary sealing lips, described later, are sealingly engaged.

The axially outer end of the tubular section 28 is connected to a radially outwardly extending flange 32. The term "axially outer" or "axially outwardly" as used herein is intended to mean the direction toward the air side of the seal. Conversely, the term "axially inner" or "axially inwardly" means the direction toward the oil side of the seal.

The radial flange 32 is configured to form a radially inner curved section 34 and a radially outer upright section 36. The curved inner section 34 has a precision finished, axially inner, dust sealing surface 38 which tapers axially outwardly and radially inwardly. The upright section 36 presents an axially inner abutment surface 40 extending perpendicular to the axis 42 of the seal assembly 10.

Preferably, an elastomeric annular mounting portion 44 of synthetic rubber or the like is bonded to the radially inner surface of the tubular section 28. The elastomeric mounting portion 44 prevents the shaft 18 from being damaged as the wear sleeve element 12 is press fit thereover and to provide a fluid tight seal between the shaft and the wear sleeve 26.

The seal element 14 includes an annular casing 46 made by stamping of a sheet metal blank. In the illustrated embodiment, the casing 46 has a tubular mounting section 48, a reduced diameter section 50 and an inturned radial flange 52. An annular member 54 of an elastomeric material is bonded to the outer periphery of the casing 46. The annular member 54 includes a mounting portion 56 which provides a fluid tight seal between the casing 46 and the housing 20 when the mounting section 48 is press fit within a counterbore 58 formed in the housing 20.

An annular damper 60 facing the abutment surface 40 is bonded to the radial flange 52. The damper 60 cooperates with the abutment surface 40 to position the wear sleeve element 12 and the seal element 14 relative to one another.

The unitizing ring 16 has an axially inner end 62 which is crimped or snap fit over a reduced thickness portion 64 of the elastomeric member 54 to firmly fix the unitizing ring 16 to the seal element 14. The axially outer end 66 of the unitizing ring 16 is bent radially inwardly to extend closely to and axially outwardly of the upright section 36 of the radial flange 32. The inturned end 66 is engageable with the upright section 36 and concerts with the damper 60 to limit the axial displacement of the wear sleeve element 12 relative to the seal element 14.

The unitizing ring 16 has a reduced diameter section 68 closely encircling the radially outer periphery of the upright section 36 of the radial flange 32. The inner periphery of the outer end 66 closely faces with an annular elastomeric member 70 bonded to the radial flange 32. With this arrangement, a staggered narrow path serving as a labyrinth structure is formed between the unitizing ring 16 and the wear sleeve element 12 to prevent ingress of dust and dirt.

An elastomeric annular sealing member, designated generally by the reference numeral 72, is bonded to the inner part of the radial bonding flange 52 of the seal element 14. The sealing member 72 is configured to present a primary sealing lip 74 sealingly engaging the wear surface 30 of the wear sleeve element 12. Contrary to the conventional practice, no garter spring is employed to urge the primary sealing lip 74 into sealing contact with the wear surface 30. Instead, the primary sealing lip 74 is brought into contact with the wear surface solely by the flexibility thereof.

The sealing member 72 is provided with an auxiliary sealing lip 76 sealingly engaging the wear surface 30. The auxiliary sealing lip 76 is located axially outwardly of the primary sealing lip 74 in such a manner that an annular sealed region 78 is formed between the lips 74 and 76. Any quantity of oil that may leak out of the primary sealing lip 74 will be retained in the annular region 78. Accordingly, a sufficient oil sealing action is achieved even in the absence of a conventional garter spring.

Figure 4:
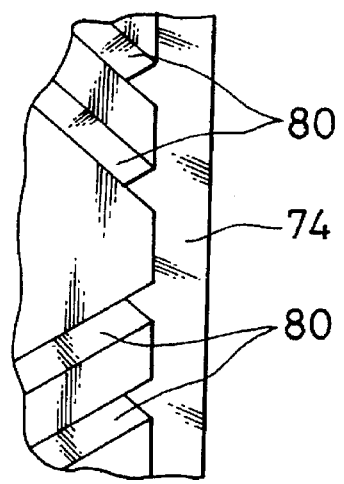
FIG. 4 is a further enlarged fragmentary elevational view showing a part of the primary sealing lip shown in FIG. 3; and, FIG. 5 is an enlarged fragmentary cross-sectional view showing a part of the unitized seal shown in FIG. 2.

As shown in FIGS. 3 and 4, each of the primary and auxiliary sealing lips 74 and 76 has an inner surface provided with a plurality of oil scraping ribs 80 extending obliquely to the axis 42 of the unitized seal 10. The oil scraping ribs 80 act to pump leaked lubricant back to the sealed region 22 as the seal element 14 rotates relative to the wear sleeve element 12.

Referring to FIGS. 2–5, the sealing member 72 is further provided with a dust sealing lip 82 cooperating with the radial flange 32 of the wear sleeve element 12. As shown enlarged in FIG. 3, the dust sealing lip 82 is configured to include a generally tubular base portion 84 and a tip portion 86 which is flared out axially outwardly and radially outwardly. The tip portion 86 sealingly engages the axially inner surface 38 of the wear sleeve element 12.

As the dust sealing surface 38 is tapered axially outwardly and radially inwardly, the point of contact of the tip portion 86 with the dust sealing surface 38 is offset axially outwardly from the plane of the abutment surface 40 of the wear sleeve element 12.

With this offset arrangement, the point of contact of the tip portion 86 will be less accessible by the flow of slime or mud water that may enter the unitized seal under rainy conditions as shown by the arrow 88 in FIG. 5. The mass of mud water 90 accumulated at the vertically upper region of a groove 92 formed by the outer periphery of the dust lip 82 will flow down circumferentially along the groove under the action of the gravity and will be discharged upon reaching the vertically lower region of the unitized seal.

As in this manner a high degree of dirt exclusion function is achieved by the dust sealing arrangement, the service life of the primary and auxiliary sealing lips 74 and 76 and, hence, of the unitized seal 10 is remarkably increased.

While the present invention has been described herein with reference to a specific embodiment thereof, it is contemplated that the present invention is not limited thereby and various changes and modifications may be made therein for those skilled in the art without departing from the scope of the invention.

What is claimed is:

1. A unitized oil seal assembly for establishing a seal between relatively rotatable shaft and housing, said seal assembly comprising:

a wear sleeve element which in use is fluid-tightly fitted over said shaft; and, a seal element cooperating with said wear sleeve and fluid-tightly secured in use to said housing;

said wear sleeve element having an axially extending wear sleeve section and a radial flange extending from an axially outer end of said wear sleeve section in a radial direction away from an axis of said assembly, said radial flange being configured to define a radially outer surface extending perpendicular to the axis of the assembly and a radially inner surface tapering axially outwardly and radially inward toward said axis of the assembly;

said seal element having an annular casing and an elastomeric annular sealing member bonded to said casing, said casing having a tubular mounting section and an inturned radial flange extending axially inwardly of said radially outer surface of said wear sleeve element, said sealing member having a primary sealing lip sealingly engaging the outer wear surface of said wear sleeve section and a dust sealing lip sealingly engaging said radially inner surface of said wear sleeve element;

said dust sealing lip being configured to fare out axially outwardly and radially away from said axis of the assembly in such a manner that a point of contact thereof with said radially inner surface of the wear sleeve element is offset axially outwardly from a plane of said radially outer surface of said wear sleeve element.

2. A unitized oil seal assembly according to claim 1, wherein said sealing member has an auxiliary sealing lip located axially outwardly of said primary sealing lip and sealingly engaging the outer surface of said wear sleeve section and wherein said primary sealing lip is resiliently brought into contact with the outer surface of said wear sleeve section solely by the flexibility thereof without being biased by a garter spring.

3. A unitized oil seal assembly according to claim 2, wherein each of said primary and auxiliary sealing lips has an inner surface provided with a plurality of oil scraping ribs extending obliquely to the axis of the assembly.

4. A unitized oil seal assembly for establishing a seal between relatively rotatable shaft and housing, said seal assembly comprising:

a wear sleeve element which in use is fluid-tightly fitted over said shaft;

a seal element cooperating with said wear sleeve and fluid-tightly secured in use to said housing; and, a unitizing ring for axially positioning said elements with one another;

said wear sleeve element having an axially extending wear sleeve section and a radial flange extending from an axially outer end of said wear sleeve section in a radial direction away from an axis of said assembly, said radial flange being configured to define a radially outer surface extending perpendicular to the axis of the assembly and a radially inner surface tapering axially outwardly and radially toward said axis of the assembly;

said seal element having an annular casing and an elastomeric annular sealing member bonded to said casing, said casing having a tubular mounting section and an inturned radial flange extending axially inwardly of said radially outer surface of said wear sleeve element, said sealing member having a primary sealing lip sealingly engaging the outer surface of said wear sleeve section and a dust sealing lip sealingly engaging said radially inner surface of said wear sleeve element;

said dust sealing lip being configured to flare out axially outwardly and radially away from said axis of the assembly in such a manner that point of contact thereof with said radially inner surface of the wear sleeve element is offset axially outwardly from a plane of said radially outer surface of said wear sleeve element.

\* \* \* \* \*